July 6, 1965    H. S. BOTTOMS ETAL    3,193,102
FILTERS
Filed June 14, 1962
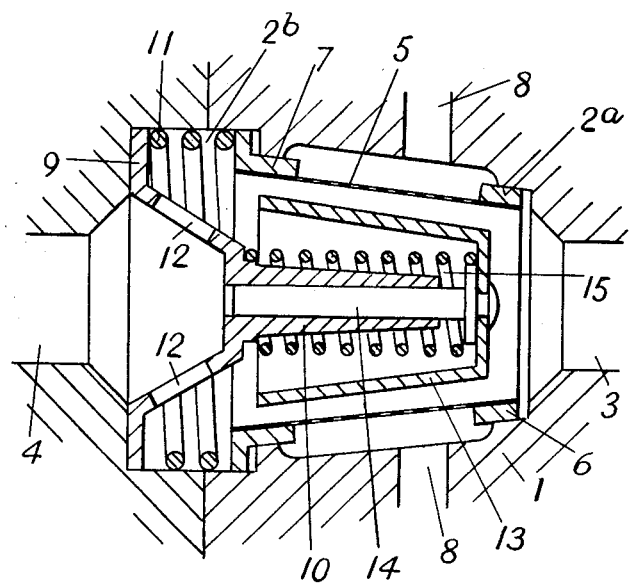

3,193,102
FILTERS
Harry Simister Bottoms, Solihull, and Thomas Campbell, Knowle, England, assignors to Joseph Lucas (Industries) Limited, Birmingham, England
Filed June 14, 1962, Ser. No. 202,472
Claims priority, application Great Britain, June 28, 1961, 23,362/61
2 Claims. (Cl. 210—137)

This invention relates to filters for filtering liquids flowing to a branch passage from a main passage, the filter being of the kind comprising a tubular filtering element which defines a part of the boundary of the main passage and through which the liquid must flow radially outwards to the branch passage, and a part supported in spaced relationship within the element so as to cause the liquid flowing through the main passage to flow in intimate contact with the internal surface of the element to impose a scouring action thereon.

The object of the invention is to provide a filter of this kind in an improved form.

According to the invention in a filter of the kind specified the element tapers in an upstream direction relative to the direction of flow through the main passage, and the part within the element is axially spring-loaded towards the narrower end of the element so as to tend to restrict the cross-sectional area between it and the element, the arrangement being such that within a predetermined range, the velocity of the flow between the element and said part will remain substantially uniform irrespective of changes in the velocity of the flow in the main passage.

An example of the invention is illustrated in longitudinal section in the accompanying drawing.

Referring to the drawing, there is provided a body part 1 in which is formed a cavity. The cavity comprises a truncated conical portion 2a which opens at its wider end into a co-axial cylindrical portion 2b of larger diameter. A co-axial cylindrical inlet 3 to the cavity opens into the narrower end of the conical portion, while a co-axial cylindrical outlet 4 of similar diameter to the inlet opens from the outer end of the cylindrical portion. The inlet 3 and outlet 4 are adapted for connection in the fuel supply line of a gas turbine engine so that the cavity is included in the main fuel passage.

Within the conical portion of the cavity there is a truncated conical tubular filtering element 5 which is of smaller diameter than the conical portion but of equal angle. A pair of rings 6, 7 secured to opposite end portions of the filtering element 5 and fitting within the conical portion 2a of the cavity serve to space the element from the wall of the cavity. The ring 7 which is secured to the wider end of the filtering element, has an outwardly directed flange the outer periphery of which bears against the wall of the cylindrical portion 2b of the cavity. A plurality of radial branch passages 8 formed in the body part are in communication with the annular space surrounding the filtering element, and are adapted for connection to a servo-mechanism which is to be supplied with filtered fuel. Such a servo-mechanism being of the kind intended to control the output of the pump delivering fuel to the engine and including pressure responsive means and a throttle control. Moreover, as shown, the passages 8 open into a circumferential recess in the wall of the conical portion 2a of the cavity.

In the cylindrical portion 2b of the cavity there is a flanged cup-like member 9 having a central hollow spigot 10 extending from its base into the conical portion 2a of the cavity. The member 9 is held in place by means of a compression spring 11 interposed between the flange of the ring 7 and the flange on the member, which bears against the outer end of the cylindrical portion 2b of the cavity. A plurality of holes 12 are formed in the member 9 to allow fuel to pass into the outlet 4 from the cavity.

In the filtering element 5 is a conical cup-like part 13 of larger cone angle but smaller diameter. This part 13 has a central stem 14 extending inwardly from its base and slidably engaged in the hollow spigot 10. A second compression spring 15 is interposed between the member 9 and the base of the part 13 to load the latter towards the narrower end of the element 5.

In operation, fuel under pressure flows from the inlet 3 to the outlet 4. A small proportion of the fuel is fed through the filtering element 5 and branch passages 8 to the servomechanism, while the main stream of fuel flows through the cavity in intimate contact with the filtering element and thereby cleans it by a scouring action. The fuel flowing through the cavity moves the conical part 13, axially against the action of the spring 15 to a position dependent upon the velocity of the flow. Also, the angle of the conical part 13 is so chosen in relation to the angle of the filtering element 5 that when the flow of fuel reaches its maximum and the part is moved to the limit of its travel against the action of the spring, the cross-sectional area of the annular passage defined between the part 13 and the element 5 is substantially uniform throughout its length, and is substantially equal to the cross-sectional area of the inlet and outlet. Thus, when the flow is at its maximum, the velocity of flow of fuel in the annular passage is substantially constant throughout the length of the passage and is also substantially equal to the flow velocity in the inlet and outlet. Moreover, when the flow rate is below its maximum the part 13 will be moved by the spring 15 to reduce the cross-sectional area of the annular passage so as to maintain the velocity at which the fuel flows through the passage at a value sufficient to provide adequate scouring of the filter element 5.

Having thus described out invention what we claim as new and desire to secure by Letters Patent is:

1. A wash filter comprising in combination a body part, a main passage defined within the body part, said main passage including liquid inlet and outlet means formed in the body part for causing liquid to flow through the main passage, a branch passage extending from said main passage, a tubular filter element located in the main passage between the branch passage and the inlet means, said filter element being tapered towards said inlet means, a part including means mounting said part in spaced relationship within the filter element for causing liquid flowing through the main passage to flow against the inlet side surface of the filter element to wash therefrom any contaminant deposited thereon from liquid passing to the branch passage, said means mounting said part so as to permit limited axial movement thereof relative to the filter element, said mounting means including a spring for urging the part towards the inlet end of the filter element whereby as the rate of flow through the main passage increases the part will be moved against the action of the spring and the size of the space defined between the filter element and the part will increase due to the tapering form of the filter element.

2. A wash filter according to claim 1 in which said mounting means includes stop means for limiting the movement of the part against its spring and in which both the filter element and part are of truncated conical form, the part having a larger cone angle than the filter element whereby, when the part is moved against said stop means, the cross-sectional area of the annular passage defined between the part and the filter element will be substantially constant throughout its length.

References Cited by the Examiner
UNITED STATES PATENTS 3,109,809  11/63  Verrando _____ 210—130
3,120,490  2/64  Samson _____ 210—409 X REUBEN FRIEDMAN, *Primary Examiner.*

HERBERT L. MARTIN, *Examiner.*